(12) United States Patent
Faulkner et al.

(10) Patent No.: US 12,286,237 B2
(45) Date of Patent: Apr. 29, 2025

(54) CARGO AREA LIGHTING AND MONITORING

(71) Applicant: Goodrich Corporation, Charlotte, NC (US)

(72) Inventors: Raquel A. Faulkner, Cedar Rapids, IA (US); Nathan Bennett, Mt. Pleasant, SC (US)

(73) Assignee: GOODRICH CORPORATION, Charlotte, NC (US)

( * ) Notice: Subject to any disclaimer, the term of this patent is extended or adjusted under 35 U.S.C. 154(b) by 175 days.

(21) Appl. No.: 18/107,865

(22) Filed: Feb. 9, 2023

(65) Prior Publication Data
US 2024/0270405 A1 Aug. 15, 2024

(51) Int. Cl.
B64D 47/02 (2006.01)
B64C 1/22 (2006.01)

(52) U.S. Cl.
CPC .............. B64D 47/02 (2013.01); B64C 1/22 (2013.01)

(58) Field of Classification Search
CPC .. A62C 3/08; B64C 1/22; B64D 47/02; B64D 2011/0038; G08B 17/11–113
See application file for complete search history.

(56) References Cited

U.S. PATENT DOCUMENTS

| 6,106,140 | A | 8/2000 | Krummer et al. |
| 8,199,029 | B2 | 6/2012 | Bell et al. |
| 2010/0213313 | A1* | 8/2010 | Reed ................ G06Q 10/08 244/118.1 |
| 2011/0297401 | A1 | 12/2011 | Rennie et al. |
| 2016/0042615 | A1 | 2/2016 | Turner et al. |
| 2016/0222654 | A1 | 8/2016 | Shimizu et al. |
| 2019/0100317 | A1 | 4/2019 | Pugliesi et al. |
| 2019/0351265 | A1 | 11/2019 | Riedel |
| 2021/0261257 | A1 | 8/2021 | Quatmann et al. |
| 2023/0022495 | A1 | 1/2023 | Dondoneau et al. |

FOREIGN PATENT DOCUMENTS

| CN | 217305957 | 8/2022 |
| SK | 288921 | 12/2021 |

OTHER PUBLICATIONS

European Patent Office, European Search Report dated Jun. 11, 2024 in Application No. 23216856.7.

* cited by examiner

Primary Examiner — Jason M Han
(74) Attorney, Agent, or Firm — SNELL & WILMER L.L.P.

(57) ABSTRACT

A lighting and monitoring module is disclosed herein. The lighting and monitoring module includes a module body including a front surface and a back surface, the module body defining a space between the front surface and the back surface, a connector disposed within the space defined by the module body, a light disposed within the space defined by the module body, the light coupled to the connector, a first component disposed within the space defined by the module body, the first component coupled to the connector, and a second component disposed within the space defined by the module body, the second component coupled to the connector.

20 Claims, 5 Drawing Sheets

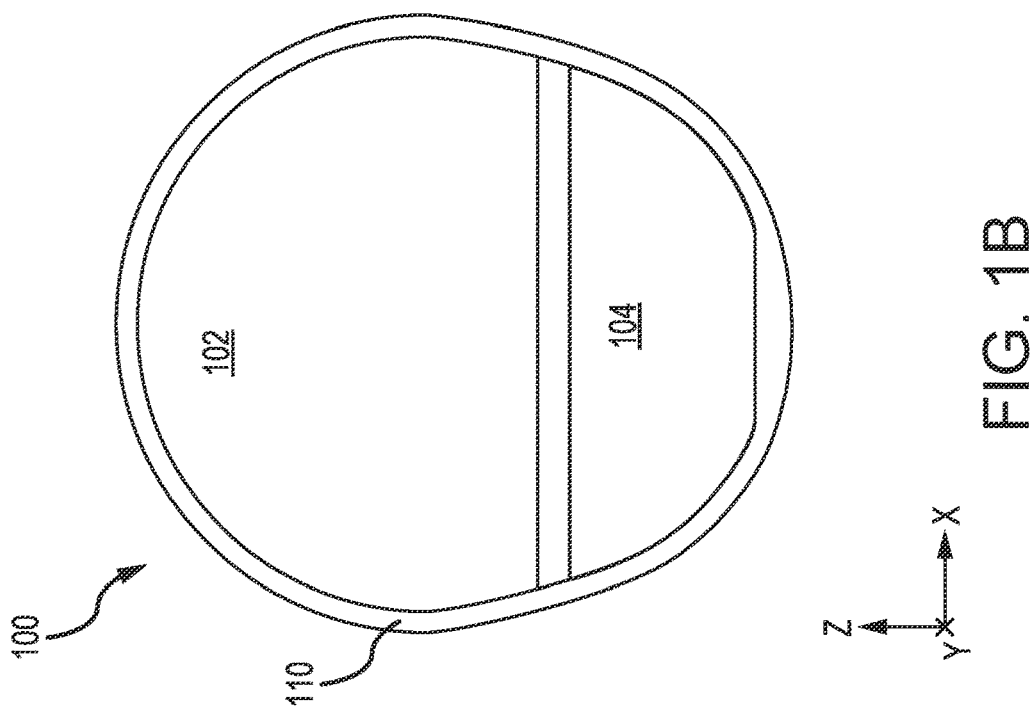
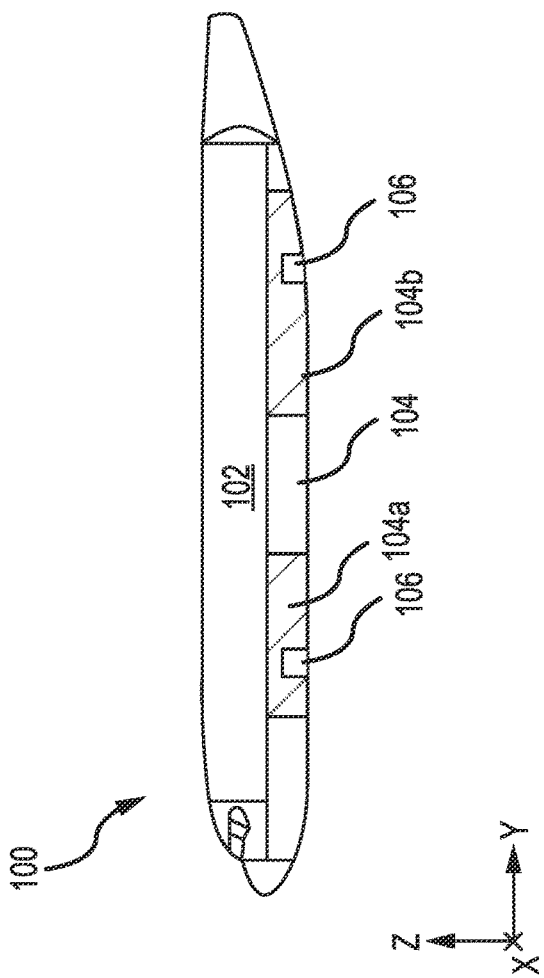
FIG. 1B
FIG. 1A

CARGO AREA LIGHTING AND MONITORING

FIELD

The present disclosure generally relates to aircraft cargo areas, and more specifically, to cargo area lighting and monitoring modules.

BACKGROUND

Passenger aircraft include one or more cargo compartments, typically below the passenger compartment, for passenger luggage and other cargo. Cargo aircraft typically include one or more cargo compartments. Currently, cargo area lights, sensors, and fire protection are installed and maintained individually. These components are typically installed in clusters of individual components or as single components near an electrical and/or data connection. Installing and maintaining the individual components uses multiple connectors and multiple different housings. Additionally, each component may be sourced and maintained by different providers. This results in increase in cost, weight, and complexity.

SUMMARY

Disclosed herein is a lighting and monitoring module. The lighting and monitoring module includes a module body including a front surface and a back surface, the module body defining a space between the front surface and the back surface, a connector disposed within the space defined by the module body, a light disposed within the space defined by the module body, the light coupled to the connector, a first component disposed within the space defined by the module body, the first component coupled to the connector, and a second component disposed within the space defined by the module body, the second component coupled to the connector.

In various embodiments, the connector is configured to receive power from an aircraft and provide power to each of the light, the first component, and the second component. In various embodiments, the connector is further configured to provide data connection to the aircraft, wherein the first component is configured to send and receive data to the aircraft through the connector. In various embodiments, the light, the first component, and the second component are configured to be removable from the module body.

In various embodiments, the first component and the second component includes at least one of a smoke detector, a temperature sensor, a pressure sensor, a camera, or a fire extinguisher. In various embodiments, the module body has a first length and a radius of curvature, the radius of curvature being equal to the first length. In various embodiments, the light, the first component, and the second component each extend outward from the space and through the front surface.

Also disclosed herein is an integrated cargo area lighting and monitoring module. The integrated cargo area lighting and monitoring module includes a module body including a front surface and a back surface, the module body defining a space between the front surface and the back surface, a light removably coupled to the module body, the light being disposed within the space defined by the module body and extending through the front surface, a first component removably coupled to the module body adjacent the light, the first component being disposed within the space defined by the module body, a second component removably coupled to the module body adjacent the light, the second component being disposed within the space defined by the module body, and a connector disposed within the space defined by the module body and extending through the back surface, the connector coupled to the light, the first component, and the second component, and the connector configured to receive power and provide power to the light, the first component, and the second component.

In various embodiments, the connector is further configured to provide a data connection between at least one of the first component or the second component and an aircraft. In various embodiments, the integrated cargo area lighting and monitoring module further a first cable having a first end coupled to the light and a second end coupled to the connector, a second cable having a first end coupled to the first component and a second end coupled to the connector, and a third cable having a first end coupled to the second component and a second end coupled to the connector.

In various embodiments, the module body has a first length and the module body has a radius of curvature equal to the first length. In various embodiments, the first component and the second component are one of a smoke detector, a temperature sensor, a pressure sensor, a camera, or a fire extinguisher. In various embodiments, the light, the first component, and the second component extend through the front surface. In various embodiments, the module body further includes a sidewall and the integrated cargo area lighting and monitoring module further includes a third component removably coupled to the module body adjacent the light, the third component being disposed within the space defined by the module body and extending through the sidewall.

Also disclosed herein is a cargo compartment. The cargo compartment includes a sidewall, a ceiling connected to a top end of the sidewall and a plurality of integrated cargo area lighting and monitoring modules. Each integrated cargo area lighting and monitoring module includes a module body including a front surface and a back surface, the module body defining a space between the front surface and the back surface, a connector disposed within the space defined by the module body, a light disposed within the space defined by the module body, the light coupled to the connector, a first component disposed within the space defined by the module body, the first component coupled to the connector, and a second component disposed within the space defined by the module body, the second component coupled to the connector.

In various embodiments, the sidewall has a first radius of curvature and the module body has a second radius of curvature that is equal to the first radius of curvature. In various embodiments, the connector is configured to receive power from an aircraft and provide power to each of the light, the first component, and the second component. In various embodiments, the connector is further configured to provide data connection to the aircraft, wherein the first component is configured to send and receive data to the aircraft through the connector.

In various embodiments, the first component and the second component are one of a smoke detector, a temperature sensor, a pressure sensor, a camera, or a fire extinguisher. In various embodiments, the light, the first component, and the second component each extend outward from the space and through the front surface.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 1A, 1, and 1C illustrate views of an aircraft fuselage, in accordance with various embodiments.

DETAILED DESCRIPTION

Figure 1C:
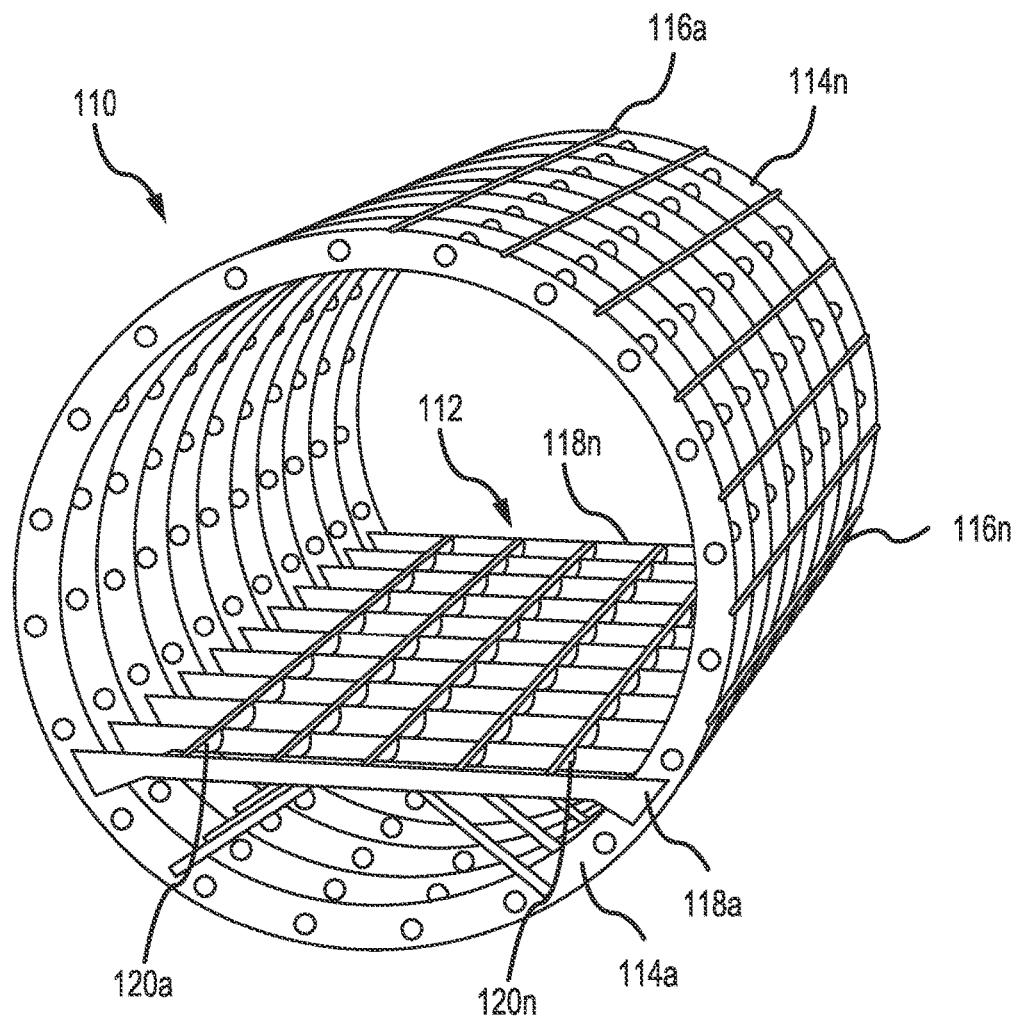

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an integrated cargo area lighting and monitoring module. In various embodiments, the integrated cargo area lighting and monitoring module includes multiple components including one or more lights, a smoke detector, and a fire extinguisher in a compact, integrated module. In various embodiments, the integrated cargo area lighting and monitoring module may include additional components such as one or more cameras, one or more temperature sensors, one or more pressure sensors, or one or more microphones, among others. In various embodiments, the integrated cargo area lighting and monitoring module may be installed on a spline or a ceiling of a passenger aircraft cargo deck. In various embodiments, the integrated cargo area lighting and monitoring module may be installed in different orientations (e.g., perpendicular to the spline) than is available to conventional systems. In various embodiments, each component of the integrated cargo area lighting and monitoring module may be individually removed from the module to be serviced or replaced while the module is installed. In various embodiments, the components of the integrated cargo lighting and monitoring module may be replaced while the module is installed.

In various embodiments, the integrated cargo area lighting and monitoring module reduces the overall amount of wiring used for installing lighting and sensors. For example, the integrated cargo area lighting and monitoring module may include a single external connector (e.g., power) to the aircraft. In various embodiments, the integrated cargo area lighting and monitoring module may include a second connector (e.g., data) to transmit data (e.g., from sensors or cameras) to the aircraft. In various embodiments, the integrated cargo area lighting and monitoring module may include a single connector for both power and data.

Referring now to FIGS. 1A-1C, an aircraft 100 is illustrated, in accordance with various embodiments. Aircraft 100 includes an upper compartment 102, a lower compartment 104, and one or more cargo doors 106. Upper compartment 102 and lower compartment 104 are defined by an airframe 108 that may include a hoop frame 110 and a floor frame 112. Hoop frame 110 may include a plurality of hoops 114a-114n coupled together by a plurality of stringers 116a-116n extending longitudinally (e.g., in the y-direction). Each hoop 114a-114n has a radius of curvature that defines the shape of the body of aircraft 100. Floor frame 112 may include a plurality of floor joists 118a-118n extending laterally (e.g., in the x-direction) coupled together by a plurality of floor beams 120a-120n extending longitudinally (e.g., in the y-direction). In various embodiments, wires and/or cables for power and data, among others, may be run throughout aircraft 100 along stringers 116a-116n, floor beams 120a-120n, floor joists 118a-118n, and/or hoops 114a-114n. In various embodiments, aircraft 100 may include attachment points for lights, sensors, cameras, etc. on stringers 116a-116n, floor beams 120a-120n, floor joists 118a-118n, and/or hoops 114a-114n.

In various embodiments, upper compartment 102 may be defined as being above (e.g., the positive z-direction) floor frame 112 and lower compartment may be defined as being below (e.g., the negative z-direction) floor frame 112. In various embodiments, aircraft 100 may be a passenger aircraft with upper compartment 102 being a passenger area and lower compartment 104 being a cargo/luggage compartment. In various embodiments aircraft 100 may be a cargo aircraft with upper compartment 102 and lower compartment 104 being cargo compartments. In various embodiments cargo door(s) 106 may be used to access lower compartment 104. In various embodiments, lower compartment 104 may be divided into a first compartment 104a and a second compartment 104b, as illustrated in FIG. 1A. In various embodiments, additional cargo doors may be used to access upper compartment 102.

Figure 2:
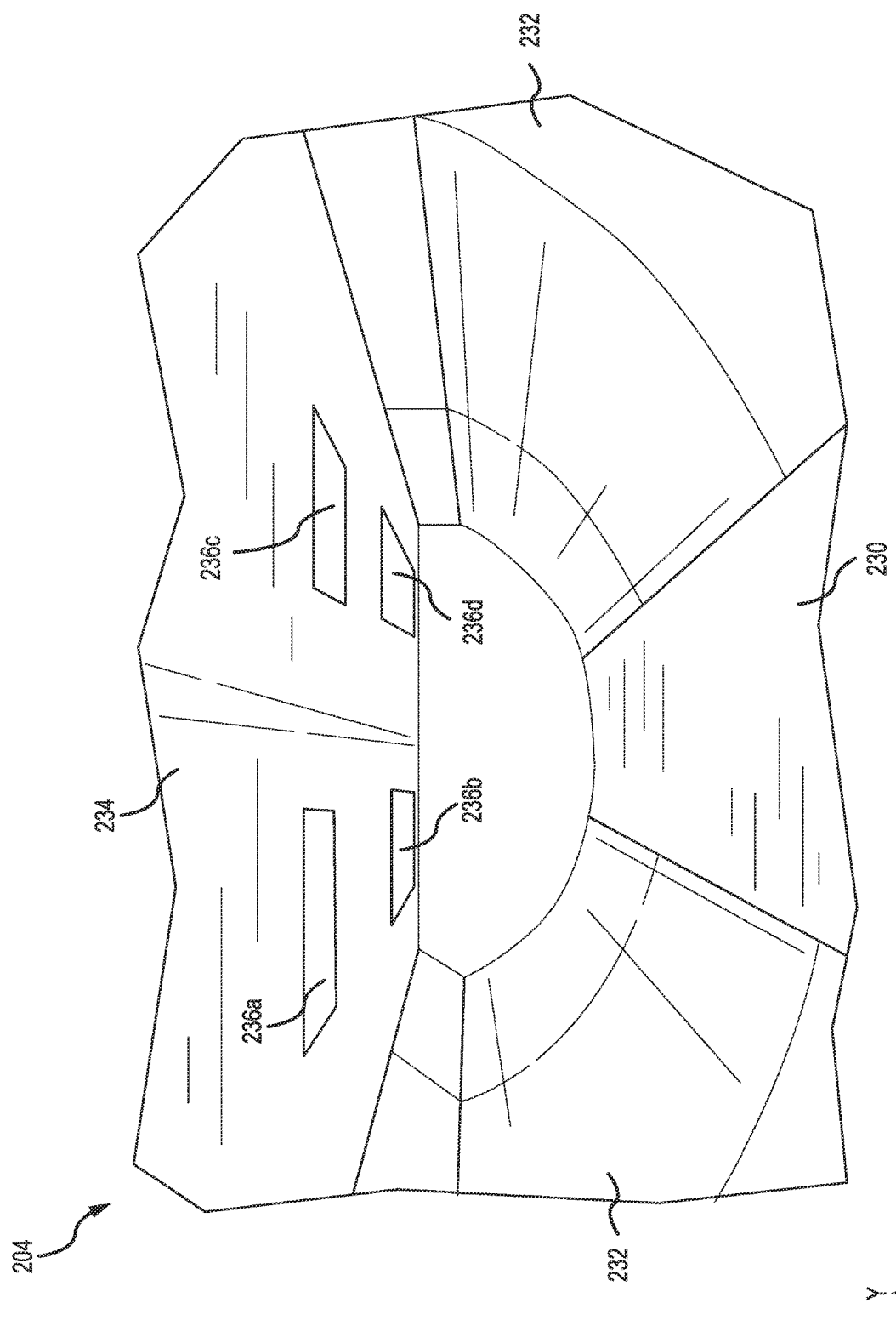
FIG. 2 illustrates a cargo hold of an aircraft, in accordance with various embodiments.

Referring now to FIG. 2, a lower compartment 204 of aircraft 100 is illustrated, in accordance with various embodiments. Lower compartment 204 may be an example of lower compartment 104 and may be disposed within hoop frame 110. Lower compartment 204 includes a floor 230, sidewalls 232, and a ceiling 234. In various embodiments, floor 230 and sidewalls 232 may be disposed on hoop frame 110, and more specifically, on hoops 114a-114n and below (e.g., in the negative z-direction) floor frame 112. In various embodiments, ceiling 234 may be disposed on an underside (e.g., in the negative z-direction) of floor frame 112, and more specifically, on an underside of floor joists 118a-118b and floor beams 120a-120n.

Lower compartment 204 further one or more integrated cargo area lighting and monitoring modules 236. In various embodiments, upper compartment 102 described above may also include one or more integrated cargo area lighting and monitoring modules 236. However, for ease of discussion, the description herein will describe the integrated cargo area lighting and monitoring module 236 installed in lower compartment 204.

In the various embodiments, lower compartment 204 includes a first integrated cargo area lighting and monitoring module 236a, a second integrated cargo area lighting and monitoring module 236b, a third integrated cargo area lighting and monitoring module 236c, and a fourth integrated cargo area lighting and monitoring module 236d. Each integrated cargo area lighting and monitoring module 236a-236d, referred to collectively as integrated cargo area lighting and monitoring module 236, may be installed on one of hoops 114a-114n, stringers 116a-116n, floor joists 118a-118n, or floor beams 120a-120n. In various embodiments, one or more integrated cargo area lighting and monitoring module 236 may be installed on a sidewall 232 of lower compartment 204.

Figure 3A:
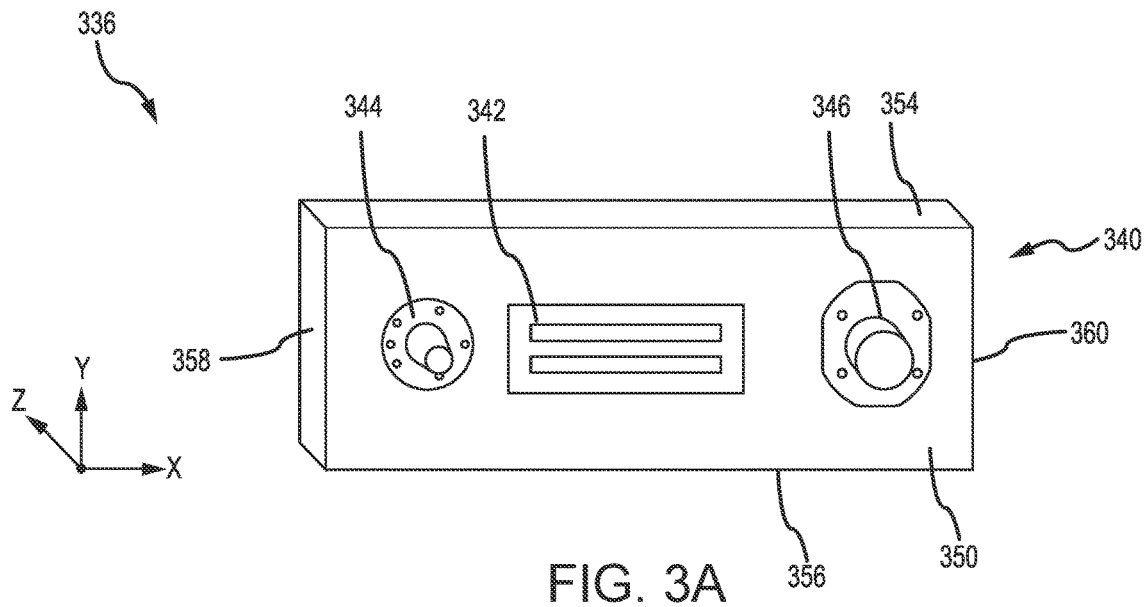
FIGS. 3A, 3B, and 3C illustrate a cargo area lighting and monitoring module, in accordance with various embodiments.
Figure 3B:
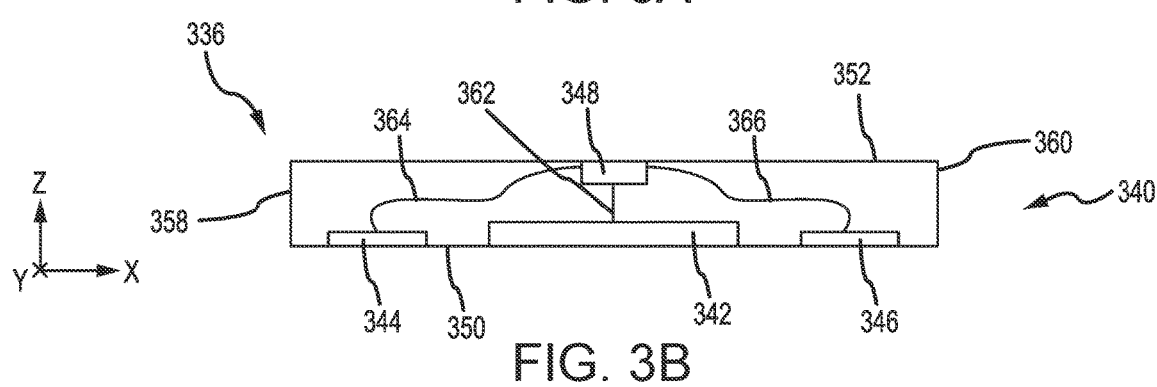
Figure 3C:
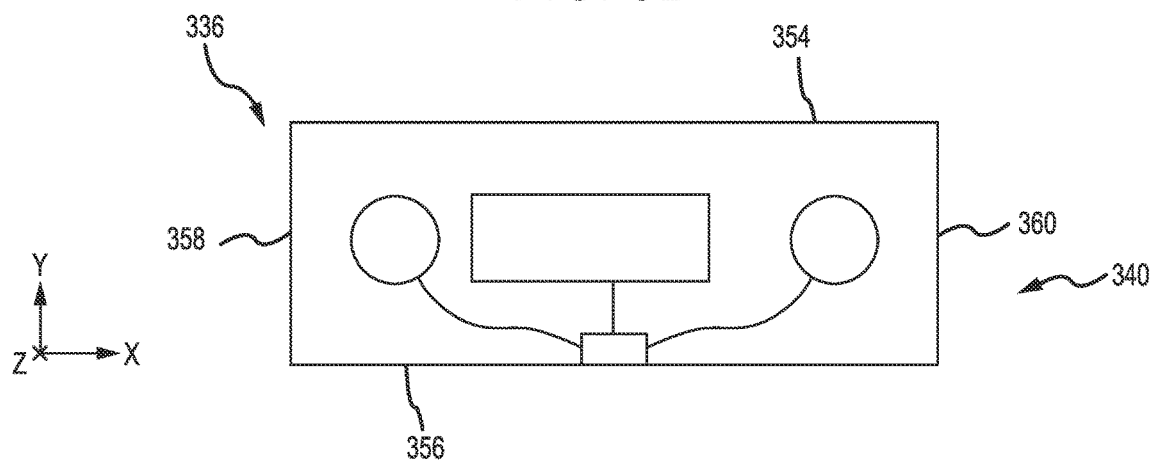

Referring now to FIGS. 3A-3C, an integrated cargo area lighting and monitoring module 336 is illustrated, in accordance with various embodiments. In various embodiments, integrated cargo area lighting and monitoring module 336 may be configured to be installed in lower compartment 104/204 and/or upper compartment 102 of aircraft 100 as described above with respect to FIGS. 1A-1C and FIG. 2. FIG. 3A illustrates a perspective view of integrated cargo area lighting and monitoring module 336, FIG. 3B illustrates a cross section view of integrated cargo area lighting and monitoring module 336 from the top of monitoring module 336, and FIG. 3C illustrates a top down cross section view of the back of integrated cargo area lighting and monitoring module 336.

Integrated cargo area lighting and monitoring module 336 includes a module body 340, a light 342, a first component 344, a second component 346, and a connector 348. Light 342, first component 344, second component 346, and connector 348 are located within module body 340. Integrated cargo area lighting and monitoring module 336 further includes a first cable 362 connecting light 342 to connector 348, a second cable 364 connecting first component 344 to connector 348, and a third cable 366 connecting second component 346 to connector 348. In various embodiments, first cable 362, second cable 364, and third cable 366 may be configured to transfer power from connector 348 to the respective component. In various embodiments, first cable 362, second cable 364, and/or third cable 366 may be further configured to transfer data to and from connector 348 and the respective component. In various embodiments, first cable 362, second cable 364, and/or third cable 366 may include power wires, twisted wire pairs (e.g., ethernet), or coaxial cable, among other power and data wire options.

In various embodiments, first component 344 may be a smoke detector and second component 346 may be a fire extinguisher nozzle. In various embodiments, first component 344 or second component 346 may be a temperature sensor, a pressures sensor, a camera, or a microphone, among other components. It should be understood that more components may be added to integrated cargo area lighting and monitoring module 336 than first component 344 and second component 346. In various embodiments, first component 344 may be a smoke detector, second component 366 may be a temperature sensor, and integrated cargo area lighting and monitoring module 336 may further include one or more of a fire extinguisher nozzle, a camera, a pressure sensor, or other cargo area sensors.

Module body 340 has a front surface 350, a back surface 352, a top surface 354, a bottom surface 356, a first side surface 358, and a second side surface 360. In various embodiments, light 342, first component 344, and second component 346 extend outward from module body 340 and through front surface 350. In various embodiments, one or more of light 342, first component 344, and second component 346 may extend through top surface 354, bottom surface 356, first side surface 358, or second side surface 360. Accordingly, it is understood that the configuration of the various components with integrated cargo area lighting and monitoring module 336 are configurable and adaptable to different designs.

In various embodiments, connector 348 extends through back surface 352 of module body 340. In various embodiments, connector 348 is recessed in back surface 352. In various embodiments, connector 348 extends outward from module body 340, and more specifically, outward from back surface 352. In various embodiments, connector 348 may extend through top surface 354, bottom surface 356, first side surface 358, or second side surface 360. In various embodiments, connector 348 may include a power connection to supply power to light 342, first component 344, and second component 346. The power connection may be configured to receive power from aircraft 100 (e.g., 28 volts) and provide power to light 342, first component 344, and second component 346 via cables 362, 364, and 366, respectively. In various embodiments, connector 348 may further include a data connection to provide a data communication path for light 342, first component 344, and second component 346. Accordingly, connector 348 may be configured to communicate with the various components installed in integrated cargo area lighting and monitoring module 336 using first cable 262, second cable 264, and third cable 266, for example.

Connector 348 provides a single point of connection between integrated cargo area lighting and monitoring module 336 and aircraft 100. In various embodiments, connector 348 is configured to connect with existing connectors in aircraft 100, such as for example, those currently being used to connect lights and sensors individually. Accordingly, integrated cargo area lighting and monitoring module 336 may reduce the number of connectors and/or connections used to install lights and sensors in aircraft 100.

Integrated cargo area lighting and monitoring module 336 further has accessibility for the components (e.g., light 342, first component 344, and second component 346) to remove, repair, or replace each component without uninstalling integrated cargo area lighting and monitoring module 336. That is, light 342, first component 344, and/or second component 346 may be removed from module body 340 and replaced without removing module body 340 from aircraft 100. This allows for repairs to be performed, parts to be replaced, and upgrades to be made with less effort than removing and replacing all components, wires, and connections as conventionally done.

Figure 4A:
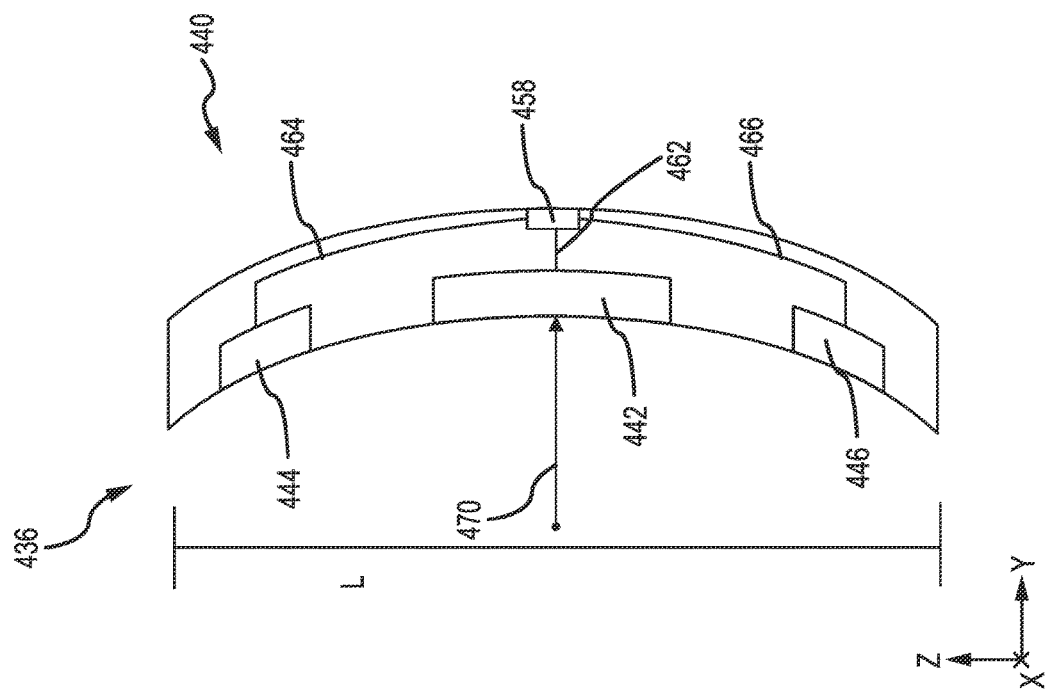
FIGS. 4A and 4B illustrate a cargo area lighting and monitoring module, in accordance with various embodiments.
Figure 4B:
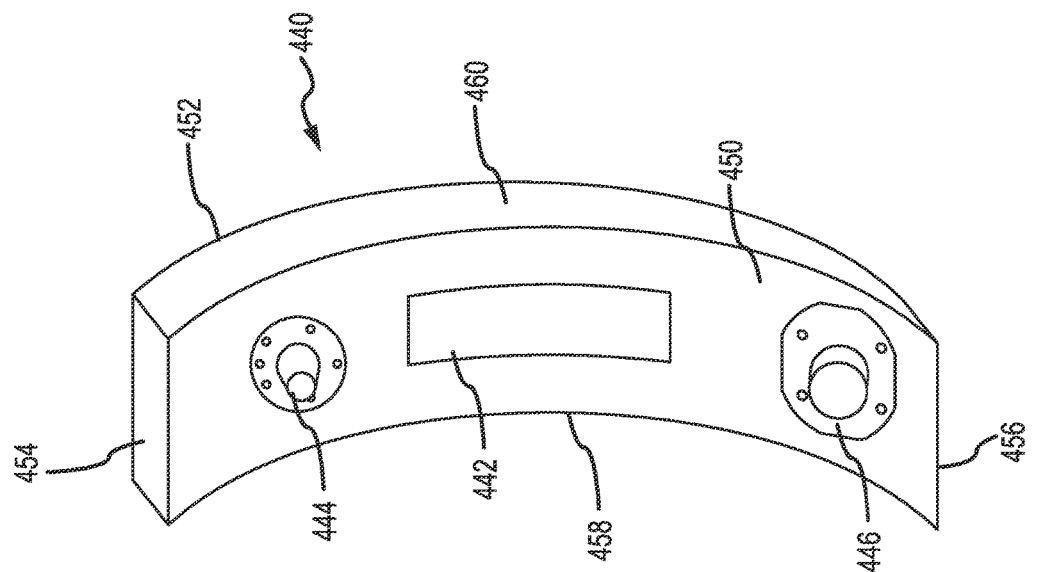

Referring now to FIGS. 4A and 4B, integrated cargo area lighting and monitoring module 436 is illustrated, in accordance with various embodiments. In various embodiments, integrated cargo area lighting and monitoring module 436 may be configured to be installed in lower compartment 104/204 and/or upper compartment 102 of aircraft 100 as described above with respect to FIGS. 1A-1C and FIG. 2. FIG. 4A illustrates a perspective view of integrated cargo area lighting and monitoring module 436 and FIG. 4B illustrates a cross section view from the side of integrated cargo area lighting and monitoring module 436.

Integrated cargo area lighting and monitoring module 436 includes similar components to those described above with respect to integrated cargo area lighting and monitoring module 336 in FIGS. 3A-3C, including a module body 440, a light 442, a first component 444, a second component 446, and a connector 448. Light 442, first component 444, second component 446, and connector 448 are located within module body 440. Integrated cargo area lighting and monitoring module 436 further includes a first cable 462 connecting light 442 to connector 448, a second cable 464 connecting first component 444 to connector 448, and a third cable 466 connecting second component 446 to connector 448. In various embodiments, first cable 462, second cable 464, and third cable 466 may be configured to transfer power from connector 448 to the respective component. In various embodiments, first cable 462, second cable 464, and/or third cable 466 may be further configured to transfer data to and from connector 448 and the respective component. In various embodiments, first cable 462, second cable 464, and/or third cable 466 may include power wires, twisted wire pairs (e.g., ethernet), or coaxial cable, among other power and data wire options.

Module body 440 has a front surface 450, a back surface 452, a top surface 454, a bottom surface 456, a first side surface 458, and a second side surface 460. In various embodiments, light 442, first component 444, and second component 446 extend outward from module body 440 and through front surface 450. In various embodiments, one or more of light 442, first component 444, and second component 446 may extend through top surface 454, bottom surface 456, first side surface 458, or second side surface 460. Accordingly, it is understood that the configuration of the various components with integrated cargo area lighting and monitoring module 436 are configurable and adaptable to different designs.

Module body 440, and more specifically, front surface 450, back surface 452, top surface 454, bottom surface 456, first side surface 458, and second side surface 460 have a radius of curvature 470. In various embodiments, radius of curvature 470 may be larger or smaller than illustrated. Radius of curvature 470 may be designed to match the radius of curvature of hoops 114a-114n as described above with respect to FIG. 1C. Radius of curvature 470 of module body 440 allows integrated cargo area lighting and monitoring module 436 to be installed flush or substantially flush to the wall of aircraft 100, and more specifically, to a cargo compartment of aircraft 100 (e.g., upper compartment 102, lower compartment 104, etc.). Integrated cargo area lighting and monitoring module 436 has a length L (e.g., in the z-plane). As illustrated in FIGS. 4A and 4B, radius of curvature 470 extends along the length of integrated cargo area lighting and monitoring module 436 (e.g., length L). In various embodiments, module body 440 may instead have a radius of curvature 470 along a width of integrated cargo area lighting and monitoring module 436 (e.g., in the y-plane). In various embodiments, radius of curvature 470 is about one half of length L to about 3 times length L, and more specifically, about length L to about 2 times length L.

The integrated cargo area lighting and monitoring modules described herein provide a single module to be installed in an aircraft that reduces the number of connectors used, the weight of the combined components, and the complexity of installation and maintenance of the components. In various embodiments, the weight is reduced by each component being located in the same module body instead of having their own individual housings. Additionally, the integrated cargo area lighting and monitoring module described herein improves flexibility and upgradeability. That is, additional components may be added to the existing integrated cargo area lighting and monitoring module. In various embodiments, the integrated cargo area lighting and monitoring module can be replaced with a new integrated cargo area lighting and monitoring module having more components without adding additional connector to the installation location.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A lighting and monitoring module, comprising:
    a module body including a front surface and a back surface, the module body defining a space between the front surface and the back surface;
    a connector disposed within the space defined by the module body;
    a light disposed within the space defined by the module body, the light coupled to the connector;
    a first component disposed within the space defined by the module body, wherein the first component is a smoke detector and is coupled to the connector; and
    a second component disposed within the space defined by the module body, wherein the second component is a fire extinguisher and is coupled to the connector.

2. The lighting and monitoring module of claim 1, wherein the connector is configured to receive power from an aircraft and provide power to each of the light, the first component, and the second component.

3. The lighting and monitoring module of claim 2, wherein the connector is further configured to provide data connection to the aircraft, wherein the first component is configured to send and receive data to the aircraft through the connector.

4. The lighting and monitoring module of claim 1, wherein the light, the first component, and the second component are configured to be removable from the module body while the module body is installed.

5. The lighting and monitoring module of claim 1, further comprising at least one of a temperature sensor, a pressure sensor, or a camera.

6. The lighting and monitoring module of claim 1, wherein the module body has a first length and a radius of curvature, the radius of curvature being equal to the first length.

7. The lighting and monitoring module of claim 1, wherein the light, the first component, and the second component each extend outward from the space and through the front surface.

8. An integrated cargo area lighting and monitoring module, comprising:
    a module body including a front surface and a back surface, the module body defining a space between the front surface and the back surface;
    a light removably coupled to the module body, the light being disposed within the space defined by the module body and extending through the front surface;
    a first component removably coupled to the module body adjacent the light, the first component being a smoke detector disposed within the space defined by the module body;
    a second component removably coupled to the module body adjacent the light, the second component being a fire extinguisher disposed within the space defined by the module body; and
    a connector disposed within the space defined by the module body and extending through the back surface, the connector coupled to the light, the first component, and the second component, and the connector configured to receive power and provide power to the light, the first component, and the second component.

9. The integrated cargo area lighting and monitoring module of claim 8, wherein the connector is further configured to provide a data connection between at least one of the first component or the second component and an aircraft.

10. The integrated cargo area lighting and monitoring module of claim 8, further comprising:
    a first cable having a first end coupled to the light and a second end coupled to the connector;
    a second cable having a first end coupled to the first component and a second end coupled to the connector; and
    a third cable having a first end coupled to the second component and a second end coupled to the connector.

11. The integrated cargo area lighting and monitoring module of claim 8, wherein the module body has a first length and the module body has a radius of curvature equal to the first length.

12. The integrated cargo area lighting and monitoring module of claim 8, further comprising are at least one of a temperature sensor, a pressure sensor, or a camera.

13. The integrated cargo area lighting and monitoring module of claim 8, wherein the light, the first component, and the second component extend through the front surface.

14. The integrated cargo area lighting and monitoring module of claim 8, wherein the module body further includes a sidewall, the integrated cargo area lighting and monitoring module, further comprising:
    a third component removably coupled to the module body adjacent the light, the third component being disposed within the space defined by the module body and extending through the sidewall.

15. A cargo compartment, comprising:
a sidewall;
a ceiling connected to a top end of the sidewall; and
a plurality of integrated cargo area lighting and monitoring modules, each integrated cargo area lighting and monitoring module including:
- a module body including a front surface and a back surface, the module body defining a space between the front surface and the back surface;
- a connector disposed within the space defined by the module body;
- a light disposed within the space defined by the module body, the light coupled to the connector;
- a first component disposed within the space defined by the module body, wherein the first component is a smoke detector and is coupled to the connector; and
- a second component disposed within the space defined by the module body, wherein the second component is a fire extinguisher and is coupled to the connector.

16. The cargo compartment of claim 15, wherein the sidewall has a first radius of curvature and the module body has a second radius of curvature that is equal to the first radius of curvature.

17. The cargo compartment of claim 15, wherein the connector is configured to receive power from an aircraft and provide power to each of the light, the first component, and the second component.

18. The cargo compartment of claim 17, wherein the connector is further configured to provide data connection to the aircraft, wherein the first component is configured to send and receive data to the aircraft through the connector.

19. The cargo compartment of claim 15, further comprising are at least one of a temperature sensor, a pressure sensor, or a camera.

20. The cargo compartment of claim 15, wherein the light, the first component, and the second component each extend outward from the space and through the front surface.

* * * * *